United States Patent
Tsubone et al.

(10) Patent No.: US 9,592,873 B2
(45) Date of Patent: Mar. 14, 2017

(54) MOTORCYCLE

(71) Applicant: Kawasaki Jukogyo Kabushiki Kaisha, Hyogo (JP)

(72) Inventors: Toshiyuki Tsubone, Kobe (JP); Norimasa Yamamoto, Akashi (JP); Hiroshi Kato, Kakogawa (JP); Naoto Yoshida, Akashi (JP); Tomo Yamamoto, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/741,358

(22) Filed: Jun. 16, 2015

(65) Prior Publication Data

US 2016/0009329 A1    Jan. 14, 2016

(30) Foreign Application Priority Data

Jul. 9, 2014    (JP) ................................. 2014-141082

(51) Int. Cl.
*B62J 37/00*    (2006.01)
*F02M 35/10*    (2006.01)
*F02M 35/16*    (2006.01)
*F02M 25/08*    (2006.01)

(52) U.S. Cl.
CPC .......... *B62J 37/00* (2013.01); *F02M 25/0809* (2013.01); *F02M 25/0872* (2013.01); *F02M 35/10222* (2013.01); *F02M 35/162* (2013.01); *F02M 2025/0845* (2013.01)

(58) Field of Classification Search
CPC ........... B62J 35/00; B62J 37/00; F02M 25/08; F02M 25/0809
See application file for complete search history.

(56) References Cited

U.S. PATENT DOCUMENTS

| 8,418,794 B2* | 4/2013 | Shibata | B62J 35/00 180/219 |
|---|---|---|---|
| 8,439,146 B2* | 5/2013 | Tanaka | B60K 15/03504 180/219 |
| 9,211,931 B2* | 12/2015 | Nishiguchi | F02M 25/08 |
| 2011/0240392 A1* | 10/2011 | Iwata | B60K 11/04 180/229 |
| 2011/0308874 A1* | 12/2011 | Tanaka | B60K 15/03504 180/219 |

FOREIGN PATENT DOCUMENTS

| EP | 2574529 A | 8/2012 |
|---|---|---|
| JP | 56-053973 A | 5/1981 |
| JP | 2012-007490 A | 1/2012 |
| JP | 2014-069772 | 4/2014 |

* cited by examiner

*Primary Examiner* — Anne Marie Boehler
*Assistant Examiner* — Marlon A Arce (57) ABSTRACT

A fuel tank is disposed between a head pipe and a rider's seat of a motorcycle. A combustion engine is disposed below the fuel tank, and a canister is disposed between the head pipe and the fuel tank. A check valve is disposed on a communication pipe unit which connects the canister and an air intake passage. Both ends of the first communication pipe are supported by the combustion engine through a throttle body and the check valve, respectively.

12 Claims, 8 Drawing Sheets

MOTORCYCLE

CROSS REFERENCE TO THE RELATED APPLICATION

This application is based on and claims Convention priority to Japanese patent application No. 2014-141082, filed Jul. 9, 2014, the entire disclosure of which is herein incorporated by reference as a part of this application.

BACKGROUND OF THE INVENTION

Field of the Invention

The present invention relates to a motorcycle which includes a canister containing an adsorbent which adsorbs fuel evaporative gas from a fuel tank.

Description of Related Art

A motorcycle has been known in which a fuel evaporative gas treatment device treats fuel evaporative gas generated when fuel is supplied to a fuel tank (e.g., see JP Laid-open Patent Publication No. 2014-069772).

A canister in JP Laid-open Patent Publication No. 2014-069772 is disposed inside a fairing which is made of a resinous material and covers an outer lateral side of a front portion of the motorcycle body. In the case where the canister is disposed inside the fairing, a communication pipe which connects the canister and a combustion engine air intake passage is supported at one end thereof by a throttle body and at the other end thereof by the fairing made of a resinous material. Thus, during assembling of the motorcycle, after a combustion engine is mounted on a frame structure of the motorcycle, the communication pipe is disposed. Therefore, the operation of mounting the communication pipe is cumbersome, and handling of the pipe is complicated.

SUMMARY OF THE INVENTION

An object of the present invention is to provide a motorcycle in which a communication pipe connecting a canister and a combustion engine air intake passage can be easily mounted and in which handling of a pipe connected to the canister can be easy.

In order to achieve the above-described object, a motorcycle according to the present invention includes: a head pipe; a seat; a fuel tank disposed between the head pipe and the seat; a combustion engine disposed below the fuel tank; a canister disposed in a region from a gap between the head pipe and the fuel tank in a front-rear direction (a motorcycle longitudinal direction) to a space below a front portion of the fuel tank, the canister containing an adsorbent which adsorbs fuel evaporative gas from the fuel tank; a throttle body disposed at the combustion engine, the throttle body forming an air intake passage on which a throttle valve is provided; and a communication pipe connecting the canister and the air intake passage, the communication pipe having one end supported by the throttle body and the other end supported by the combustion engine.

According to the above configuration, since the canister is disposed above the combustion engine and between the head pipe and the fuel tank, the distances from the canister to the fuel tank and the throttle body are rendered to be short. Therefore, since pipes connected to the canister are also rendered to be short, these pipes are easily handled, and the shape of each pipe itself can be simplified. In addition, since both ends of the communication pipe are supported by the combustion engine, the communication pipe can be stably supported. Also, since the communication pipe is installed into the combustion engine simultaneously with assembling of the combustion engine, it is unnecessary to mount the communication pipe to the motorcycle after the combustion engine is mounted to the motorcycle, and therefore, the communication pipe is easily mounted on the motorcycle.

In the present invention, preferably, the motorcycle further includes a pair of left and right main frame pieces branching from the head pipe and extending rearward, and the canister is disposed between the pair of left and right main frame pieces. According to this configuration, it is possible to dispose the canister rearward of the head pipe and in a vacant space between the left and right main frame pieces.

In the present invention, preferably, at least a part of the canister is disposed in a region which overlaps a cylinder head of the combustion engine in a plan view. According to this configuration, the distance from the canister to the throttle body also becomes short, and thus the pipe connected to the canister becomes short. Therefore, the pipe is easily handled. In particular, a pipe for fuel evaporative gas is subjected to special processing such that the fuel evaporative gas is prevented from leaking therefrom, thus the cost-effectiveness caused by shortening the pipe is great, and the effect of making handling of the pipe easy is also great.

In the present invention, preferably, the canister has a box shape having a longitudinal direction, and is disposed such that the longitudinal direction coincides with a widthwise direction of the motorcycle. According to this configuration, the dimensions of the canister in the front-rear direction (longitudinal direction) and in an up-down direction (a vertical direction) become small, and thus the canister is easily installed.

In the present invention, preferably, a cylinder head cover of the combustion engine has an upper surface extending so as to be inclined downward towards the front, and the canister has a lower surface which is opposed to the upper surface of the cylinder head cover and extends so as to be inclined downward towards the front. According to this configuration, while the canister is disposed above the cylinder head cover, a desired distance between the canister and the high-temperature cylinder head cover is easily ensured.

In the present invention, preferably, the motorcycle further includes a radiator disposed frontward of the combustion engine, the canister being disposed rearward of the radiator, and a heat shield cover body disposed between the canister and the radiator. According to this configuration, the canister is protected from exhaust gas of the radiator by the heat shield cover body.

In the present invention, preferably, the motorcycle further includes an air intake chamber disposed above a crankcase of the combustion engine and an air intake duct configured to introduce incoming wind through a lateral side of the canister, which is an outer side in a widthwise direction of the motorcycle, into the air intake chamber. In such case, the air intake chamber may be configured to store intake air for the combustion engine, and the canister may be disposed frontward of the air intake chamber. According to this configuration, it is possible to prevent interference between the air intake duct and the canister.

In the case where the air intake duct is included, the communication pipe is preferably disposed at the other lateral side of the canister. According to this configuration, it is possible to install the communication pipe so as to avoid interference with the air intake duct.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described with reference to the accompanying drawings. The right-left directions in this specification are the right-left directions seen from a rider on a motorcycle.

Figure 1:
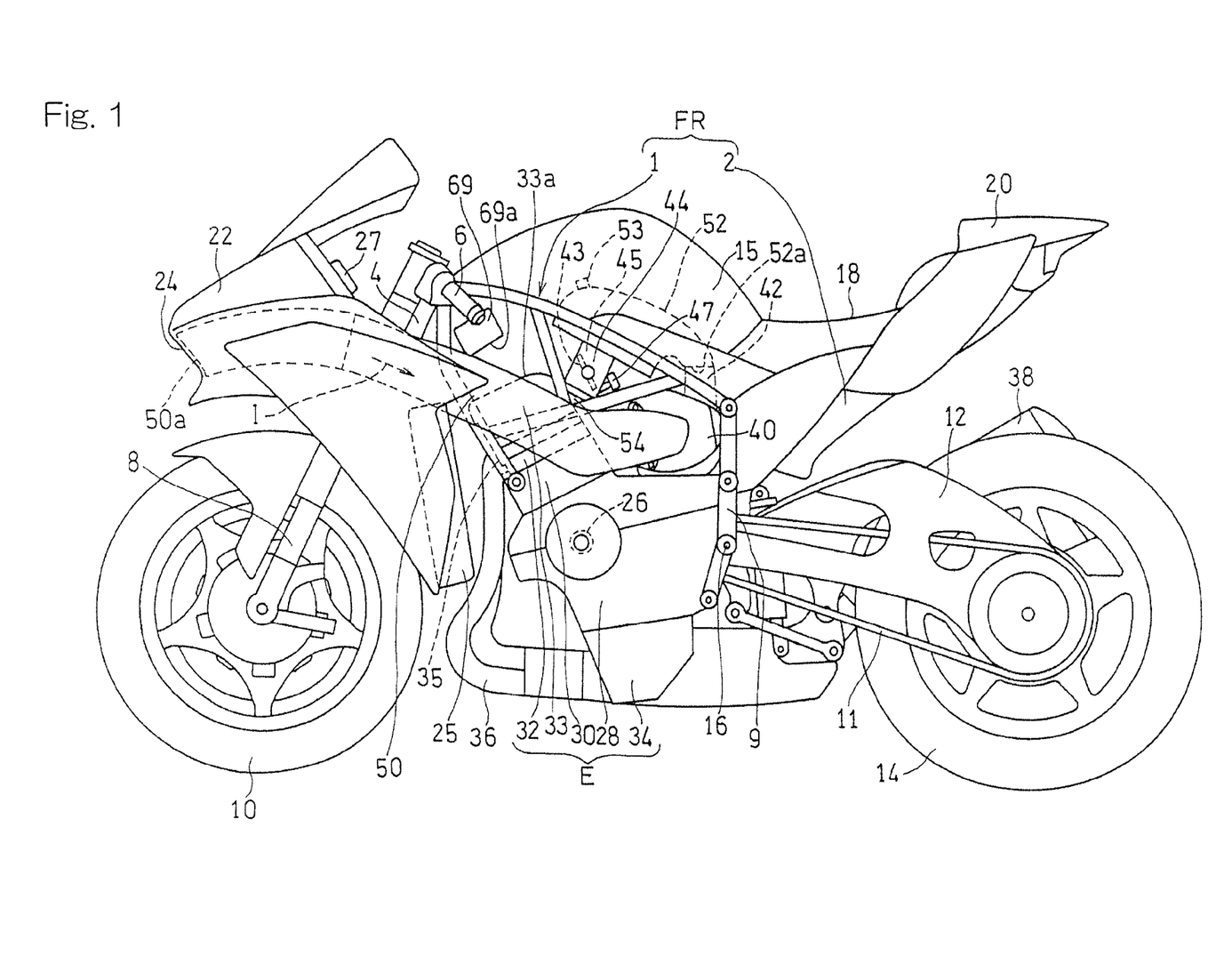
FIG. 1 is a side view showing a motorcycle according to a preferred embodiment of the present invention.

FIG. 1 is a side view of a motorcycle including a fuel evaporative gas treatment device for a fuel tank according to a first preferred embodiment of the present invention. A motorcycle frame structure FR for the motorcycle includes a main frame 1 which forms a front half of the motorcycle frame structure FR, and a rear frame 2 which forms a rear half of the motorcycle frame structure FR. A head pipe 4 is provided at a front end of the main frame 1, and a front fork 8 is rotatably supported by the head pipe 4 through a steering shaft (not shown). A steering handle 6 is fixed to an upper end portion of the front fork 8, and a front wheel 10 is fitted to a lower end portion of the front fork 8.

A swingarm bracket 9 is provided at a rear end portion of the main frame 1. A swingarm 12 is supported for swing movement in an up-down direction about a pivot shaft 16 which is mounted to the swingarm bracket 9. A rear wheel 14 is rotatably supported by a rear end portion of the swingarm 12.

A combustion engine E is fitted to a lower intermediate portion of the motorcycle frame structure FR and at the front side of the swingarm bracket 9. The combustion engine E drives the rear wheel 14 through a drive chain 11. The combustion engine E is a parallel multi-cylinder engine with a plurality of cylinders aligned in an axial direction of a crankshaft 26. In the present preferred embodiment, the combustion engine E is a four-cylinder four-cycle type multi-cylinder engine. However, the type of the combustion engine E is not limited thereto.

The combustion engine E includes a crankcase 28 which supports the crankshaft 26, a cylinder block 30 which projects upward from an upper surface of a front portion of the crankcase 28, a cylinder head 32 above the cylinder block 30, a cylinder head cover 33 above the cylinder head 32, and an oil pan 34 connected to a lower portion of the crankcase 28. The cylinder block 30 and the cylinder head 32 are inclined frontward. Thus, an upper surface 33a of the cylinder head cover 33 which covers a cam movement mechanism including a cam, a camshaft, a tappet, and the like (not shown), extends so as to be inclined downward towards the front.

Four exhaust pipes 36 are connected to four exhaust ports 35 in a front surface of the cylinder head 32. The four exhaust pipes 36 are merged together at a location beneath the combustion engine E, and are connected to an exhaust muffler 38 which is disposed at the right side of the rear wheel 14. A radiator 25 is disposed frontward of the combustion engine E.

A fuel tank 15 is disposed on an upper portion of the main frame 1, and a rider's seat 18 and a passenger's seat 20 are supported by the rear frame 2. In addition, a fairing 22 made of a resinous material is mounted on a front portion of the motorcycle body. The fairing 22 covers a portion from front of the head pipe 4 to lateral sides of the front portion of the motorcycle body, specifically, to outer lateral sides of the radiator 25. An air inlet 24 is formed in the fairing 22. The air inlet 24 is located at a front end of the fairing 22, and takes in intake air from the outside to the combustion engine E. Furthermore, an instrument unit 27 is mounted on the fairing 22.

An air intake duct 50 is disposed at the left side of the motorcycle frame structure FR. The air intake duct 50 is supported by the head pipe 4 such that a front end opening 50a thereof faces the air inlet 24 of the fairing 22. The pressure of air introduced through the front end opening 50a of the air intake duct 50 is increased by a ram effect when the air flows in the air intake duct 50.

A supercharger 42 and an air cleaner 40 which cleans outside air are disposed rearward of the cylinder block 30 and on an upper surface of a rear portion of the crankcase 28 so as to be aligned in a widthwise direction of the motorcycle such that the air cleaner 40 is located at the outer side. The air intake duct 50 introduces incoming wind as intake air from front of the combustion engine E through left outer lateral sides of the cylinder block 30 and the cylinder head 32 into the air cleaner 40. The supercharger 42 is driven by power of the combustion engine E, and supplies, after pressurizing cleaned air from the air cleaner 40, the cleaned air to the combustion engine E.

An air intake chamber 52 is disposed between the supercharger 42 and an air intake port 54 of the combustion engine E. The supercharger 42 and the air intake chamber 52 are directly connected to each other. The air intake chamber 52 stores high-pressure intake air supplied from the supercharger 42. A throttle body 44 which forms an air intake passage 45 is disposed between the air intake chamber 52 and the air intake port 54. The combustion engine E of the present preferred embodiment is a downdraft type engine in which the air intake passage 45 of the throttle body 44 extends substantially in the up-down direction.

A throttle valve 43 which adjusts an amount of intake air is provided on the air intake passage 45. In addition, a main injector 47 which is a fuel injection device configured to inject fuel toward the air intake passage 45 at the downstream side of the throttle valve 43 is provided at the throttle body 44. Furthermore, a top injector 53 which injects the fuel into the air intake chamber 52 is provided on an upper surface of the air intake chamber 52.

The air intake chamber 52 is disposed below the fuel tank 15, above the supercharger 42 and the throttle body 44, and rearward of the cylinder head 32. The air cleaner 40 is disposed below the throttle body 44 and between the crankcase 28 and the air intake chamber 52 in a side view. The fuel tank 15 is disposed above the air intake chamber 52 and the throttle body 44, that is, above the combustion engine E.

Figure 2:
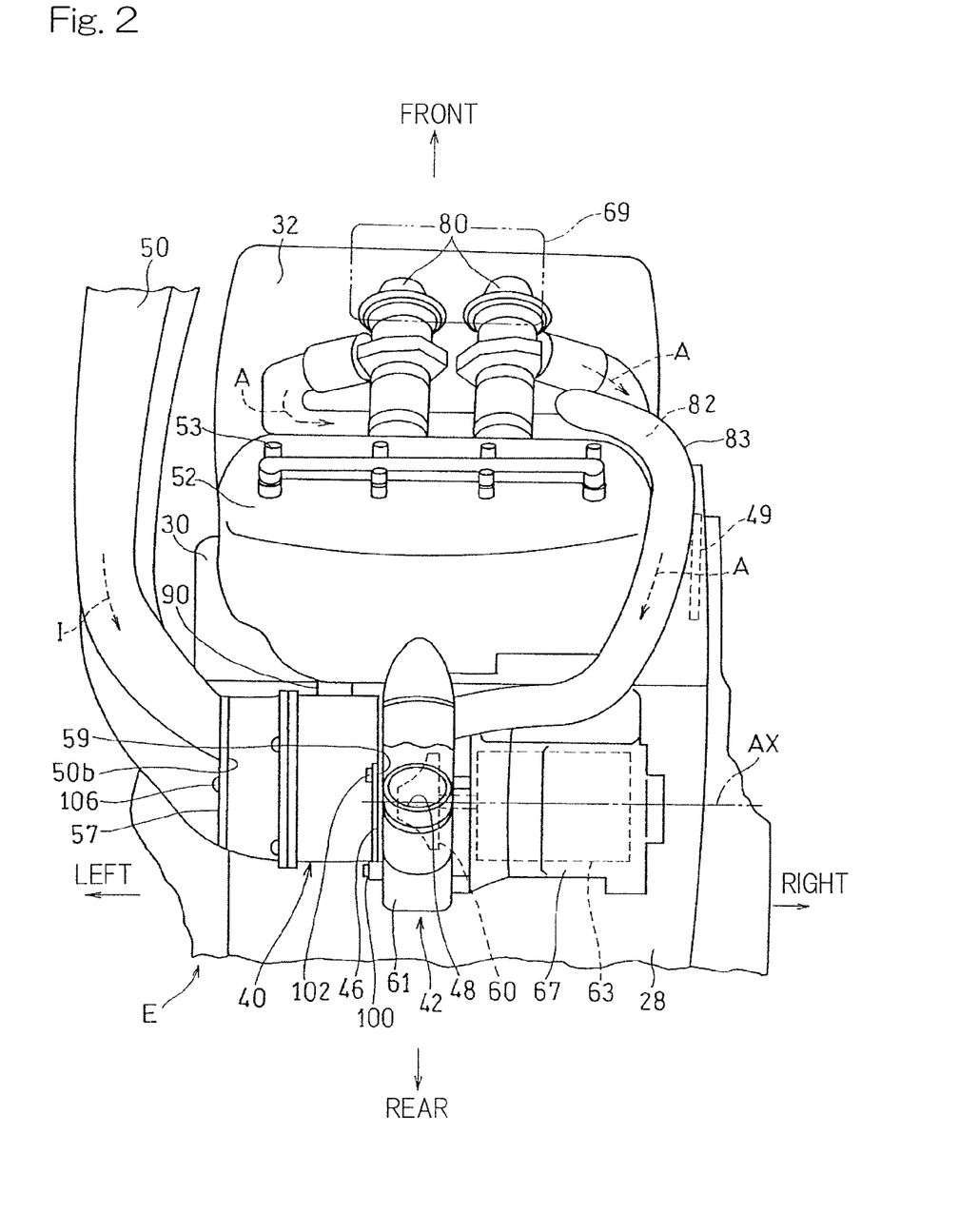
FIG. 2 is a perspective view of a combustion engine of the motorcycle, as seen from the rear and obliquely above.

As shown in FIG. 2, the supercharger 42 is disposed adjacently to and at the right side of the air cleaner 40, and fixed to an upper surface of the crankcase 28 by means of a bolt (not shown). The supercharger 42 has a rotation axis AX extending in the widthwise direction of the motorcycle, and also has a suction port 46 which is located above the crankcase 28 and in a center portion in a widthwise direction of the combustion engine E and is opened leftward. The supercharger 42 further includes a discharge port 48 which is located in the center portion in the widthwise direction of the combustion engine E and rearward of the rotation axis AX.

The supercharger 42 includes an impeller 60 which pressurizes intake air, an impeller housing 61 which covers the impeller 60, a transmission mechanism 63 which transmits power of the combustion engine E to the impeller 60, and a transmission mechanism housing 67 which covers the transmission mechanism 63. The transmission mechanism 63 and the air cleaner 40 are aligned in the widthwise direction of the motorcycle with the impeller housing 61 located therebetween. The impeller housing 61 of the supercharger 42 is connected to the transmission mechanism housing 67 by means of a plurality of bolts 100 and is connected to the air cleaner 40 by means of a plurality of bolts 102.

Relief valves 80 which adjust the air pressure in the air intake chamber 52, that is, the pressure at the downstream side of the supercharger 42 are provided at a front portion of the air intake chamber 52. To the relief valves 80, a relief pipe 83 is connected which forms a relief passage 82 which introduces high-pressure air A to the air cleaner 40. The relief pipe 83 extends rearward and obliquely downward through the right side of the air intake chamber 52, and extends, before being finally connected to the air cleaner 40, leftward below the air intake chamber 52 and between the cylinder block 30 or the cylinder head 32 and the supercharger 42.

A cleaner outlet 59 of the air cleaner 40 is connected to the suction port 46 of the supercharger 42, and a rear end portion 50b of the air intake duct 50 is connected to a cleaner inlet 57 of the air cleaner 40 from the outer side in the widthwise direction of the motorcycle. Thus, incoming wind is introduced from the air intake duct 50 through the air cleaner 40 and the supercharger 42 into the air intake chamber 52. The air cleaner 40 and the air intake duct 50 are connected to each other by means of a plurality of bolts 106. A cam chain 49 for transmitting power which drives an intake and exhaust valve is disposed at a right side portion of the cylinder block 30.

Figure 4:
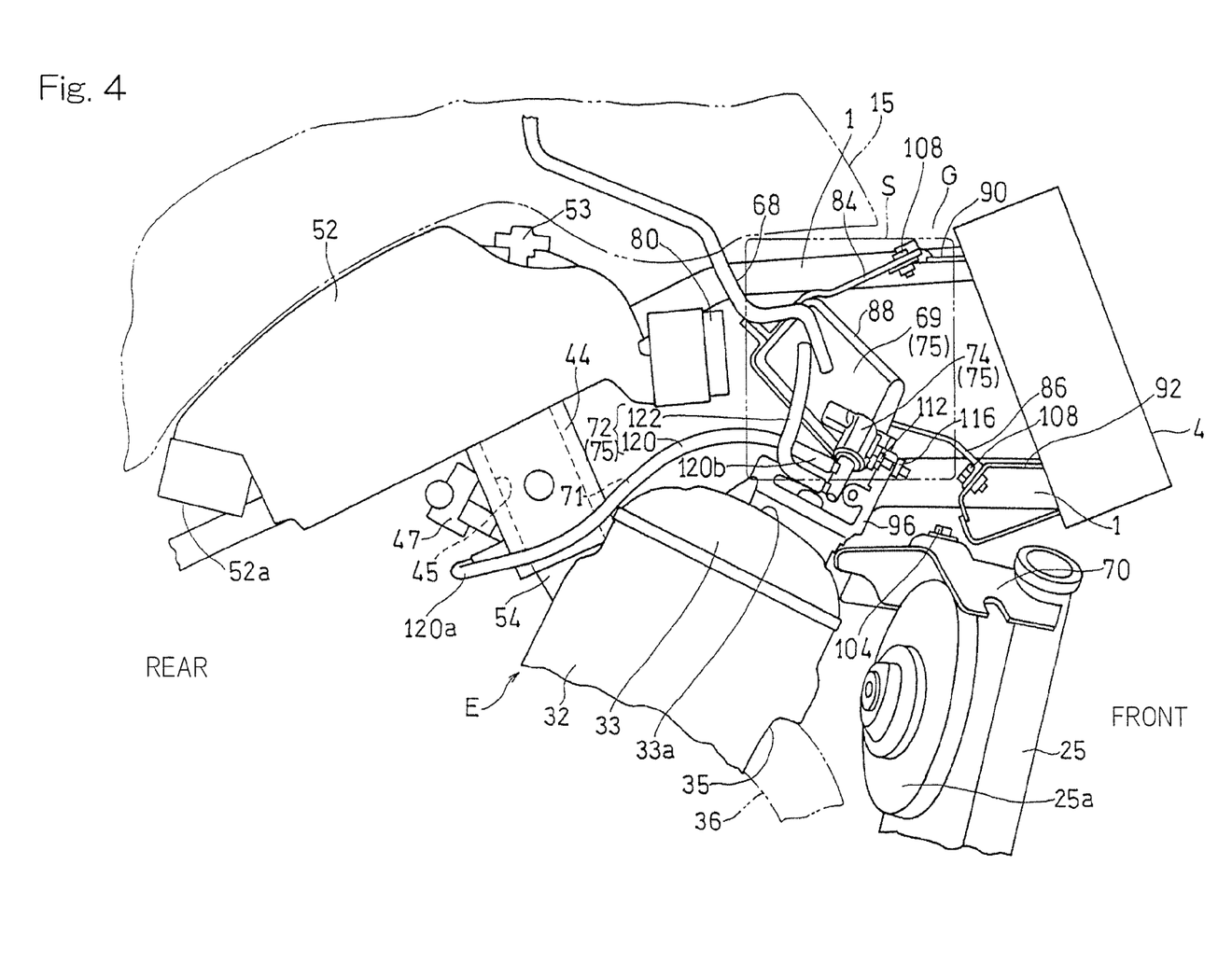
FIG. 4 is a side view showing an upper portion of a cylinder head of the combustion engine.

As shown in FIG. 1, a canister 69 which contains an adsorbent 65 (FIG. 7) configured to adsorb fuel evaporative gas G is disposed rearward of the head pipe 4, above the cylinder head 32, and below the fuel tank 15. The canister 69 is connected to a fuel fill port at an upper portion of the fuel tank 15 via a fuel evaporative gas pipe 68 (FIG. 4). The fuel evaporative gas G is generated by carbonization of a part of the fuel within the fuel tank 15.

Figure 7:
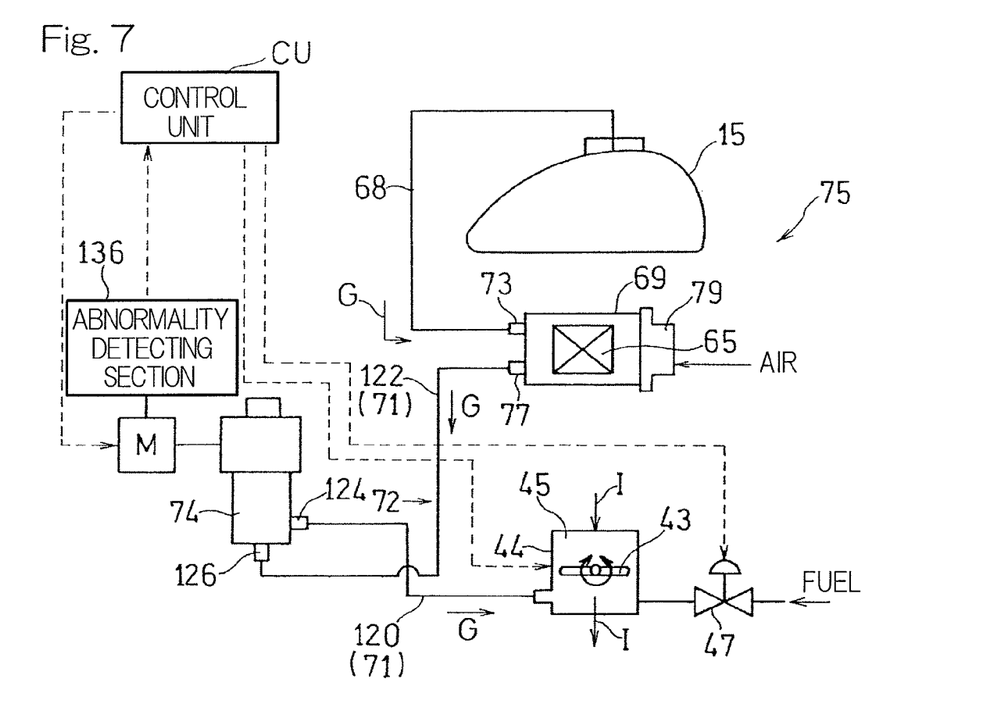
FIG. 7 is a schematic configuration diagram showing a fuel evaporative gas treatment device of the motorcycle.

As shown in FIG. 7, the canister 69 has a first connection port 73 to which the fuel evaporative gas pipe 68 is connected, a second connection port 77 to which a later-described communication pipe unit 72 is connected, and a vent port 79 which is opened to the atmosphere. The first and second connection ports 73, 77 and the vent port 79 are opened at sides opposite to each other across the adsorbent 65. Specifically, the canister 69 has a tubular shape which is elongated in an axial direction, the adsorbent 65 is disposed in an intermediate portion in the axial direction within the canister 69, the first and second connection ports 73, 77 are formed at one side of the canister 69 in the axial direction, and the vent port 79 is formed at the other side of the canister 69 in the axial direction.

The adsorbent 65 adsorbs the fuel evaporative gas G introduced from the fuel evaporative gas pipe 68. When the pressure in the air intake passage 45 for the combustion engine E is a negative pressure, the canister 69 takes in outside air (air) through the vent port 79, and introduces, after separating the fuel evaporative gas G from the adsorbent 65 with the air, the fuel evaporative gas G together with the air to the air intake passage 45. By so doing, it is possible to prevent the fuel evaporative gas G from being released to the atmosphere.

The canister 69 shown in FIG. 1 is disposed frontward of the air intake chamber 52. In the present preferred embodiment, a most part of the air intake chamber 52 is disposed rearward of the throttle body 44. Thus, a space for installing the canister 69 is easily ensured frontward of the air intake chamber 52. Furthermore, in the present preferred embodiment, an inlet 52a is provided in a rear wall of the air intake chamber 52, and, therefore, a space for installing the canister 69 is further easily ensured frontward of the air intake chamber 52. However, the inlet 52a of the air intake chamber 52 may be provided in a side wall of the air intake chamber 52.

Figure 3:
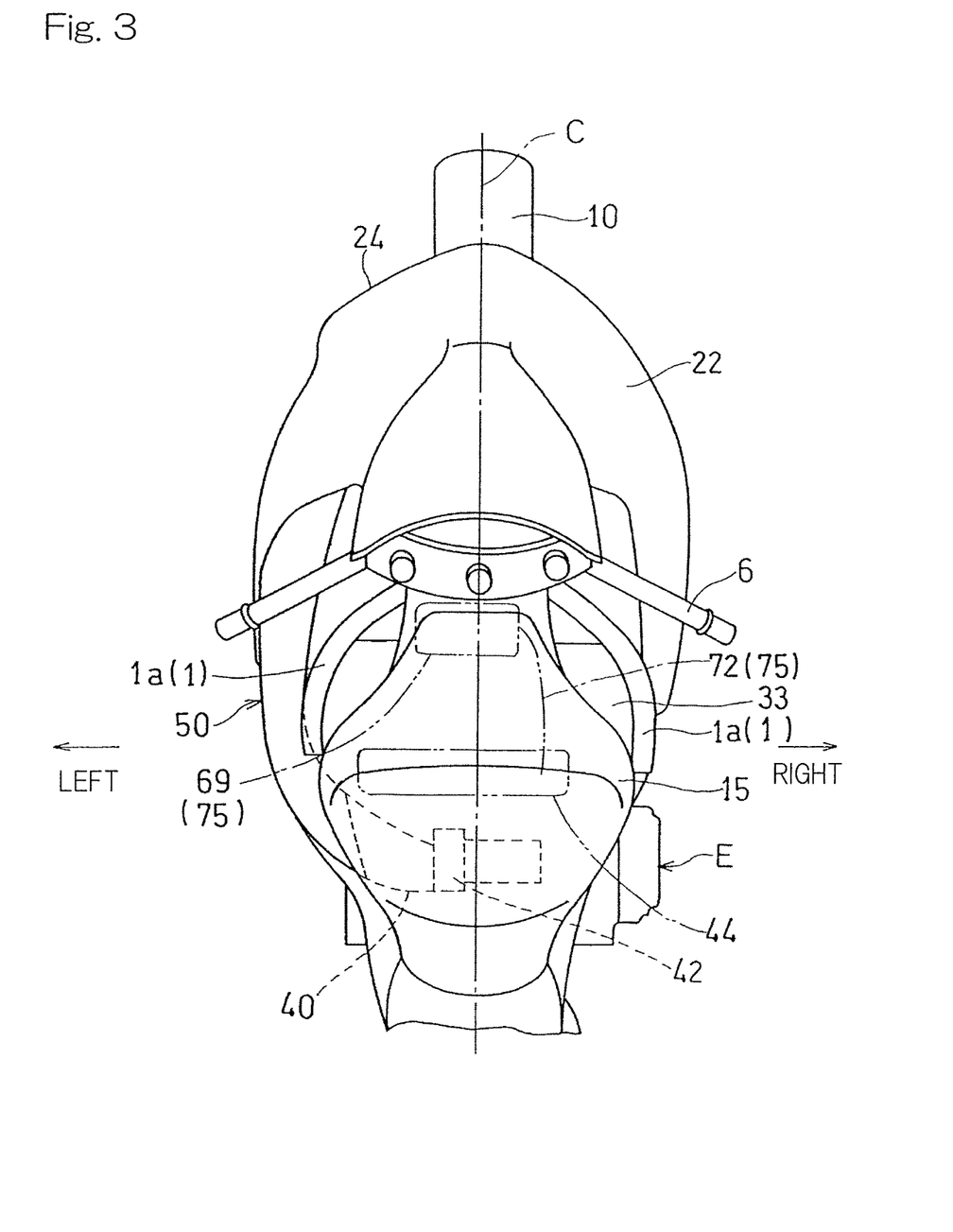
FIG. 3 is a plan view showing a front portion of the motorcycle.

As shown in FIG. 3, the main frame 1 includes a pair of left and right main frame pieces 1a, 1a which branch from the head pipe 4 and extend rearward. The canister 69 is disposed between the pair of these left and right main frame pieces 1a, 1a. That is, the canister 69 is disposed at a center portion in the widthwise direction of the motorcycle, and a part of the canister 69 is located on a center line or longitudinal line C of the motorcycle. The air intake duct 50 extends through the outer side (the left side), in the widthwise direction of the motorcycle, of the canister 69.

At least a part of the canister 69, in detail, a most part of the canister 69 excluding a front portion thereof overlaps the cylinder head 32 in a plan view. In addition, the fuel tank 15 and the canister 69 partially overlap each other in a plan view shown in FIG. 3. More specifically, a front portion of the fuel tank 15 and the most part of the canister 69 excluding the front portion thereof overlap each other in the plan view. Thus, the distance from the fuel tank 15 to the canister 69 becomes short, and the fuel evaporative gas pipe 68 (FIG. 4) is shortened.

The canister 69 has a box shape having a longitudinal direction, and has a rectangular cross section perpendicular to the longitudinal direction. The canister 69 is disposed such that the longitudinal direction coincides with the widthwise direction of the motorcycle. However, the canister 69 may be disposed such that the longitudinal direction coincides with a direction other than the widthwise direction of the motorcycle. A lower surface 69a of the canister 69 shown in FIG. 1 is opposed to the upper surface 33a of the cylinder head cover 33 and extends so as to be inclined downward towards the front.

FIG. 4 is a side view of the surrounding of the cylinder head 32 of the combustion engine E as seen from the right side of the motorcycle. The canister 69 is located within a region S from a gap G shown in FIG. 4 between the head pipe 4 and the fuel tank 15 in a front-rear direction to a space below the front portion of the fuel tank 15. The canister 69 is disposed above and rearward of the radiator 25, and a heat shield cover body 70 is disposed between the canister 69 and the radiator 25. Thus, it is possible to prevent exhaust air of radiator fans 25a from flowing toward the canister 69. In addition, the heat shield cover body 70 is disposed in a space between the exhaust ports 35 and the exhaust pipes 36, and the canister 69 in the up-down direction. Thus, it is possible to prevent exhaust heat from being transmitted to the canister 69.

Figure 5:
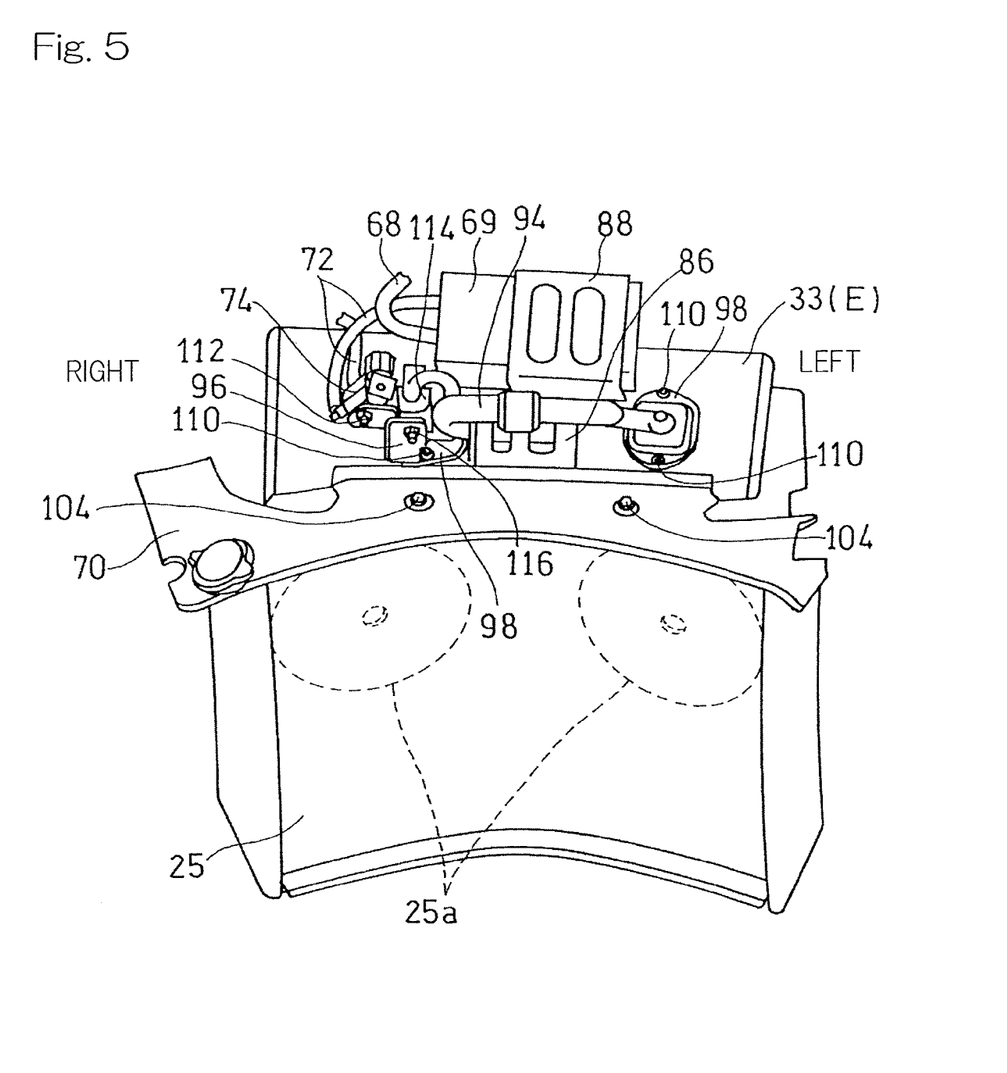
FIG. 5 is a perspective view of the combustion engine, as seen from the front and obliquely above.

As shown in FIG. 5, the heat shield cover body 70 covers the upper side of the entire range, in the widthwise direction of the motorcycle, of the radiator 25 so as to close the gap between the radiator 25 and the cylinder head cover 33 from above. The heat shield cover body 70 is attached to the main frame 1 (FIG. 1) by means of bolts 104.

As shown in FIG. 4, the canister 69 communicates with the air intake passage 45 for the combustion engine E via the communication pipe unit 72 which forms a communication passage 71. A check valve 74 which is one type of a control valve is provided on the communication pipe unit 72. The communication pipe unit 72 and the check valve 74 are disposed at the outer side (the right side), in the widthwise direction of the motorcycle, of the canister 69. The check valve 74 blocks fluid flow from the air intake passage 45 to the canister 69 and permits fluid flow from the canister 69 to the air intake passage 45. The canister 69, the communication pipe unit 72, and the check valve 74 cooperate together to constitute a fuel evaporative gas treatment device 75 for the fuel tank 15.

No check valve is provided on the fuel evaporative gas pipe 68 which connects the interior of the fuel tank 15 and the canister 69, and at the atmosphere opening side of the canister 69. As shown in FIG. 3, a system leading from the fuel tank 15 through the fuel evaporative gas treatment device 75 to the throttle body 44 is completed between the left and right main frame pieces 1a, 1a.

As shown in FIG. 4, the canister 69 is supported by the head pipe 4 through an upper bracket 84 and a lower bracket 86. Specifically, the canister 69 is mounted to a damper box 88 engaged with the upper bracket 84 and the lower bracket 86, and the upper bracket 84 and the lower bracket 86 are supported by an upper stay 90 and a lower stay 92 by means of bolts 108, respectively. The upper and lower stays 90 and 92 are fixedly attached to the head pipe 4 by means of welding. The damper box 88 is composed of an elastic body such as rubber, and holds an outer periphery of a center portion of the canister 69 in the widthwise direction of the motorcycle as shown in FIG. 5, so as to absorb vibrations from the head pipe 4.

Since the canister 69 shown in FIG. 4 is supported by the head pipe 4 at a position away upward from the combustion engine E as described above, it is possible to reduce influence of heat from the combustion engine E and suppress direct transmission of vibrations of the combustion engine E to the canister 69.

Figure 6:
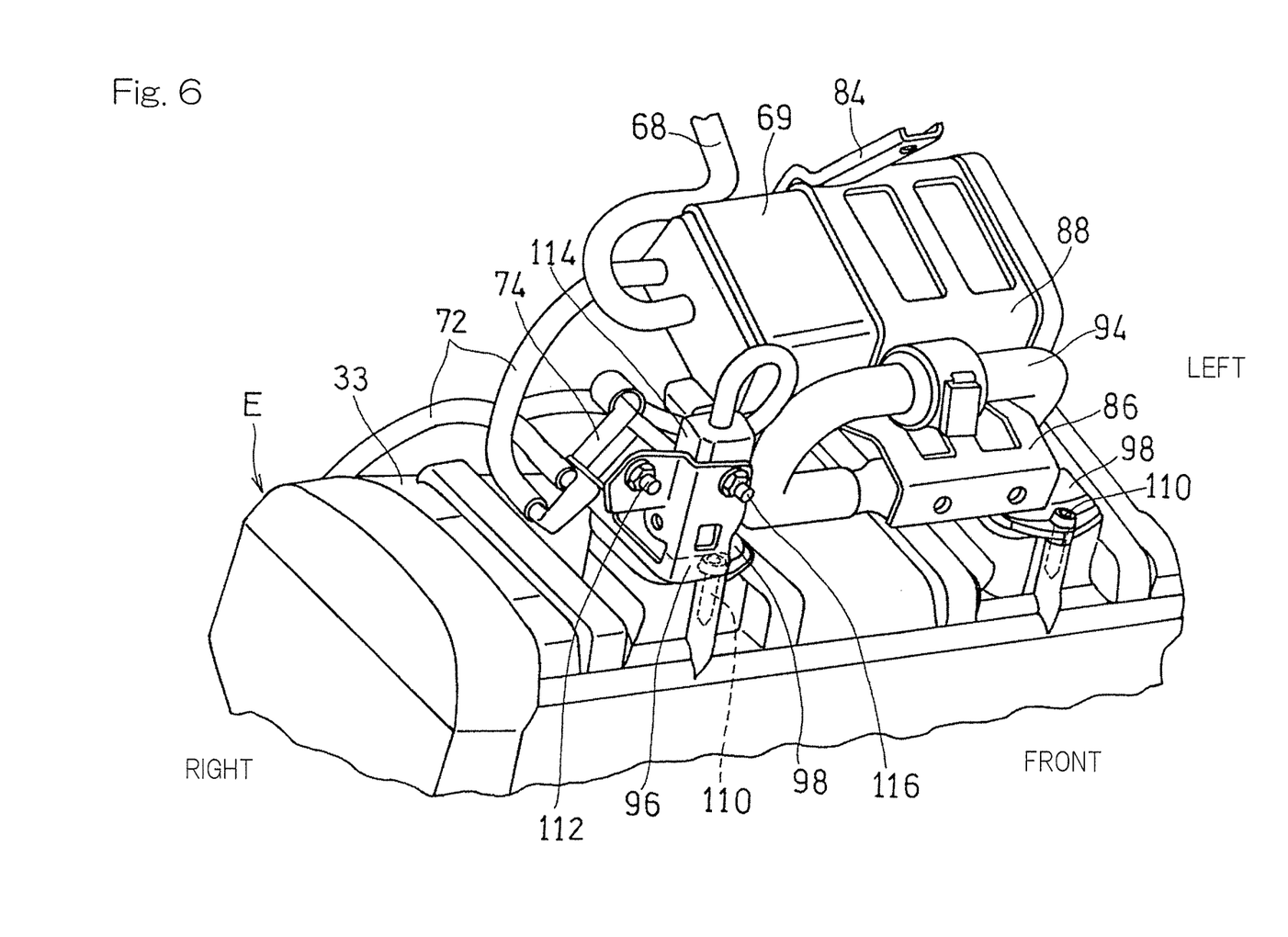
FIG. 6 is a perspective view of the combustion engine, as seen obliquely from the upper lateral side.

As shown in FIG. 6, the lower bracket 86 also serves to support a secondary air pipe 94 for the combustion engine E. The secondary air pipe 94 serves to introduce fresh air to the exhaust ports 35 (FIG. 4) in order to cause complete combustion of exhaust gas. In the present preferred embodiment, the secondary air pipe 94 injects high-pressure air within the air intake chamber 52 into a secondary air injection chamber (not shown) of the combustion engine E. Since the lower bracket 86 serves not only to support the canister 69 but also to support the secondary air pipe 94 as described above, it is possible to suppress an increase in the number of components.

The check valve 74 is supported by an injection chamber cover 98 which covers the secondary air injection chamber (not shown), through a valve bracket 96. Specifically, the valve bracket 96 and the injection chamber cover 98 are fastened together to the upper surface 33a of the cylinder head cover 33 by means of bolts 110, and the check valve 74 is attached to the valve bracket 96 by means of a fastening member 112.

Furthermore, an on-off valve 114 which switches supply or blocking of secondary air to the combustion engine E is attached to the valve bracket 96 by means of a fastening member 116. Since the check valve 74 and the on-off valve 114 are attached to the common valve bracket 96 and also the valve bracket 96 is fastened together with the injection chamber cover 98 to the cylinder head cover 33 as described above, an increase in the number of components is suppressed. The valve bracket 96 and the upper and lower brackets 84, 86 are supported at positions avoiding a spark plug port in the cylinder head cover 33. Thus, a spark plug is easily replaced.

As shown in FIG. 4, the communication pipe unit 72 includes a first communication pipe 120 which connects between the throttle body 44 and the check valve 74, and a second communication pipe 122 which connects between the check valve 74 and the canister 69. One end 120a of the first communication pipe 120 is supported by the combustion engine E through the throttle body 44, and the other end 120b of the first communication pipe 120 is supported by the combustion engine E through the check valve 74 and the valve bracket 96. In this manner, both ends 120a, 120b of the first communication pipe 120 are supported by the combustion engine E.

The first communication pipe 120 is connected to a downstream side of the air intake passage 45 of the throttle body 44. Thus, when the throttle valve 43 (FIG. 7) closes, a negative pressure within the first communication pipe 120 is likely to be created, and it is possible to prevent intake air from flowing to the canister 69 side. In addition, the first communication pipe 120 is connected to a position which is not opposed to an injection port of the main injector 47. Thus, it is possible to avoid the fuel injected from the main injector 47, from going toward the communication passage 71.

Figure 8:
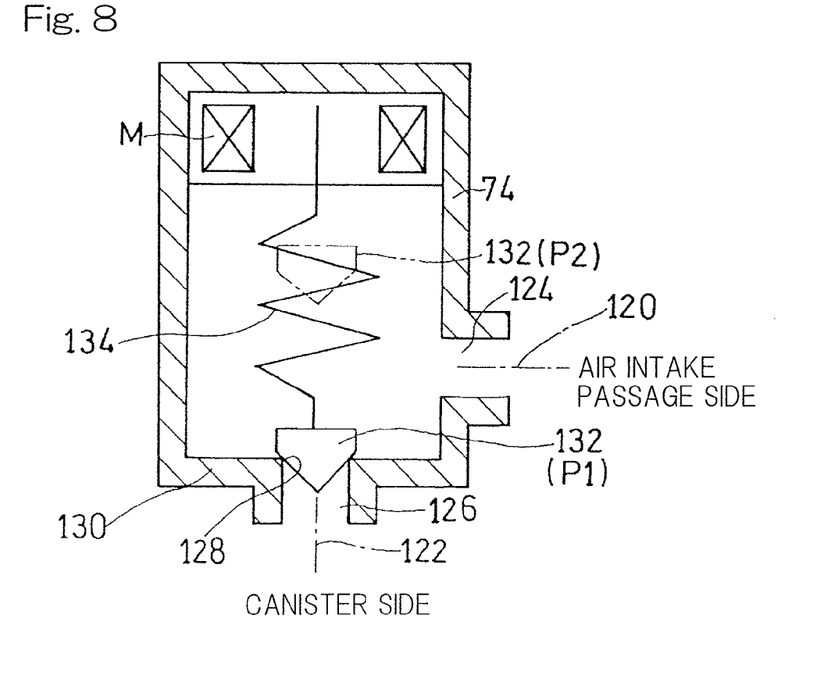
FIG. 8 is a schematic diagram showing a check valve of the fuel evaporative gas treatment device.

As shown in FIG. 8, the check valve 74 includes an air intake side communication hole 124 which communicates with the air intake passage 45, a canister side communication hole 126 which communicates with the canister 69, a partition wall 130 which separates between the air intake side and the canister side communication holes 124, 126 and has a valve port 128 communicating between the air intake side and the canister side communication holes 124, 126, and a valve body 132 which opens and closes the valve port 128. The valve body 132 is movable between a seated position P1 (a solid line in FIG. 8) at which the valve port 128 is closed and a non-seated position P2 (a double dotted line in FIG. 8) at which the valve port 128 is opened. The valve body 132 moves from a side of the air intake passage 45 (upper side in FIG. 8) to a side of the canister 69 (lower side in FIG. 8) to close the valve port 128 at the seated position P1. That is, in this preferred embodiment, when the check valve 74 is mounted on the motorcycle, the valve port 128 is located below the valve body 132.

The check valve 74 is in the form of a solenoid valve which drives the valve body 132 in an open direction by an electromagnetic force generated by energization. The check valve 74 includes a drive section M which moves the valve body 132 in a direction toward the non-seated position P2 (upward), and a biasing body 134 which biases the valve body 132 in a direction toward the seated position P1 (downward). That is, the drive section M moves, when being energized, the valve body 132 to the non-seated position P2 against a biasing force of the biasing body 134. When the energization is terminated, the valve body 132 moves to the seated position P1 because of the biasing force of the biasing body 134.

Since the solenoid valve is used, it is possible to open and close the communication passage 71 at any timing in accordance with a command from a control unit CU, regardless of the pressure difference between a primary side and a secondary side of the valve. Thus, it is possible to control timing of opening and closing of the valve body 132 on the basis of information inputted to the control unit CU such as the rotation speed of the combustion engine E, a throttle opening degree, and the pressure in the air intake passage 45. For example, during a period when an exhaust gas component with respect to a predetermined fuel injection amount is determined, control is performed so as to close the communication passage 71, whereby it is possible to prevent errors caused by mixing of the fuel evaporative gas G. In addition, in a general region during vehicle travelling excluding a region in which mixing of the fuel evaporative gas G influences driving feeling, control is performed so as to open the communication passage 71, whereby the fuel evaporative gas G is allowed to be mixed into intake air I while deterioration of driving feeling is prevented.

An average amount of opening degree of the check valve 74 may be adjusted by duty control (PWM control) using the control unit CU. By performing such duty control, it is possible to effectively adjust the amount of the fuel evaporative gas G to be introduced into the air intake passage 45, and thus disturbance of an air-fuel ratio which is caused by introduction of the fuel evaporative gas G into the air intake passage 45 is suppressed.

In a state where the check valve 74 is not energized, the valve body 132 closes the valve port 128, and the check valve 74 operates as a normal mechanical check valve. In the preferred embodiment, the check valve 74 also serves as a solenoid valve, and an energization condition for moving the valve body 132 to the non-seated position P2 is, for example, as follows.

If a negative pressure condition that the pressure in the air intake passage 45 becomes a negative pressure, that is, becomes lower than the atmospheric pressure and a stable condition indicating that the combustion engine E is in a stable state are met, the control unit CU issues a valve opening command. In the present preferred embodiment, a valve opening command is issued when both the negative pressure condition and the stable condition are met, but a valve opening command may be issued when at least the negative pressure condition is met. When both the negative pressure condition and the stable condition are met, it is possible to suppress disturbance of the air-fuel ratio which is caused by introduction of the fuel evaporative gas G into the air intake passage 45. Furthermore, by reducing the fuel injection amount of the main injector 47 simultaneously with issuing of a valve opening command, it is possible to suppress the air-fuel ratio from becoming a value corresponding to a rich state due to introduction of the fuel evaporative gas G into the air intake passage 45. In addition, in the case where an air-fuel ratio sensor is provided, a fuel injection amount during valve opening is adjusted on the basis of a detection signal of the air-fuel ratio sensor, whereby it is possible to accurately adjust the air-fuel ratio to a desired value.

The stable condition of the present preferred embodiment is that the following (1) to (6) are all met. However, the stable condition may be that at least one of the following (1) to (6) is met, or a condition other than the following (1) to (6) may be used as the stable condition.

(1) A predetermined time has elapsed from start of the combustion engine E.

(2) The opening degree of the throttle valve 43 is equal to or higher than a predetermined value.

(3) A change in the opening degree of the throttle valve 43 is within a predetermined range.

(4) The temperature of cooling water for the combustion engine E is equal to or higher than a predetermined value.

(5) A vehicle speed is equal to or higher than a predetermined value.

(6) A transmission is geared (in a state where it is possible to transmit power of the combustion engine E to drive wheels).

For example, in the case where an air-fuel ratio sensor is provided on the exhaust pipe, a detection value of the air-fuel ratio sensor may be used as the stable condition. In this case, it is preferable to use a detection value of the air-fuel ratio sensor obtained when the temperature of the cooling water for the combustion engine E is within a predetermined range and a rotation speed of the combustion engine E which is set for each gear ratio is within a predetermined range.

The negative pressure condition of the present preferred embodiment is that at least either one of the following (7) and (8) is met.

(7) An air-intake pressure in the air intake passage 45 is a negative pressure.

(8) The rotation speed of the combustion engine E is equal to or lower than a predetermined value.

As the pressure in the air intake passage 45 in the above (7), it is preferable to use, for example, a detection value of an air-intake pressure sensor which detects the pressure in the air intake passage 45 of the throttle body 44. Alternatively, a detection value of a chamber pressure sensor which detects the pressure in the air intake chamber 52 may be used.

If the rotation speed of the combustion engine E is equal to or lower than the predetermined value in the above (8), an intake air suction force of the combustion engine E is great, and the pressure in the air intake passage 45 is likely to become a negative pressure. In addition, it is preferable to set the negative pressure condition in consideration of the throttle opening degree in addition to the rotation speed of the combustion engine E. For example, when the throttle opening degree is low, even if the pressure at the upstream side of the throttle valve 43 in the air intake passage 45 is a positive pressure, the pressure at the downstream side of the throttle valve 43 may become a negative pressure. Therefore, by setting the negative pressure condition on the basis of both the throttle opening degree and the rotation speed of the combustion engine E, it is possible to accurately determine a negative pressure state.

As shown in FIG. 7, the fuel evaporative gas treatment device 75 includes an abnormality detecting section 136 which detects an abnormality in the drive section M, and the throttle valve 43 which is one type of a pressure adjuster configured to suppress an increase in the pressure within the air intake passage 45 when the abnormality detecting section 136 detects an abnormality in the drive section M. The first communication pipe 120 communicates with the downstream side of the throttle valve 43 in the air intake passage 45.

The throttle valve 43 closes the air intake passage 45 when the abnormality detecting section 136 detects an abnormality in the drive section M. By so doing, an increase in the pressure at the downstream side of the throttle valve 43 in the air intake passage 45 is suppressed, so as to prevent backflow from the air intake passage 45 to the canister 69. The check valve 74 and the throttle valve 43 are controlled on the basis of control commands from the control unit CU which is one type of a controller mounted on the vehicle.

When the abnormality detecting section 136 detects an abnormality in the drive section M, occurrence of the abnormality is displayed on the instrument unit 27 (FIG. 1). The abnormality detection with the abnormality detecting section 136 is performed by a known method based on a change in a resistance value, a current value, a voltage value, or the like of the drive section M. The abnormality detection and the pressure adjustment are performed during stop of the motorcycle or when the speed of the motorcycle is low. Thus, when the pressure adjustment is performed with the throttle valve 43, it is possible to reduce influence on driving feeling. In addition, during the pressure adjustment, by gradually varying the pressure, it is also possible to reduce the influence on driving feeling.

Regarding the pressure adjustment, output control with a method other than intake air amount control with the throttle valve 43 may be used to decrease the rotation speed of the combustion engine E. Specifically, when the abnormality detecting section 136 detects an abnormality in the drive section M, control is performed such that a fuel injection amount of the injector becomes smaller than that in a normal state. For example, the fuel injection amount of the main injector 47 may be reduced, or, instead of this, fuel injection of the top injector 53 (FIG. 2) may be stopped when the abnormality detecting section 136 detects an abnormality. In addition, even in a state where the abnormality detecting section 136 detects an abnormality in the drive section M, the main injector 47 may allow intake air amount control to be operated by an operation of the driver in a range where a negative pressure of the intake air can be maintained. Furthermore, in the case where a sub-throttle valve is provided, intake air amount control may be performed with the sub-throttle valve.

In the case where the performance of the supercharger 42 shown in FIG. 1 is adjustable, the performance of the supercharger 42 may be diminished to suppress an increase in the pressure of the intake air. Specifically, it is possible to adjust the performance of the supercharger 42 by changing the rotation speed of the supercharger 42 using a transmission or a variable speed motor. In addition, the relief valves 80 shown in FIG. 2 may be controlled to be opened to suppress an increase in the pressure of the intake air. It is preferable to use a combination of the opening control of the relief valves 80 and control of the rotation speed of the combustion engine E.

Figure 9:
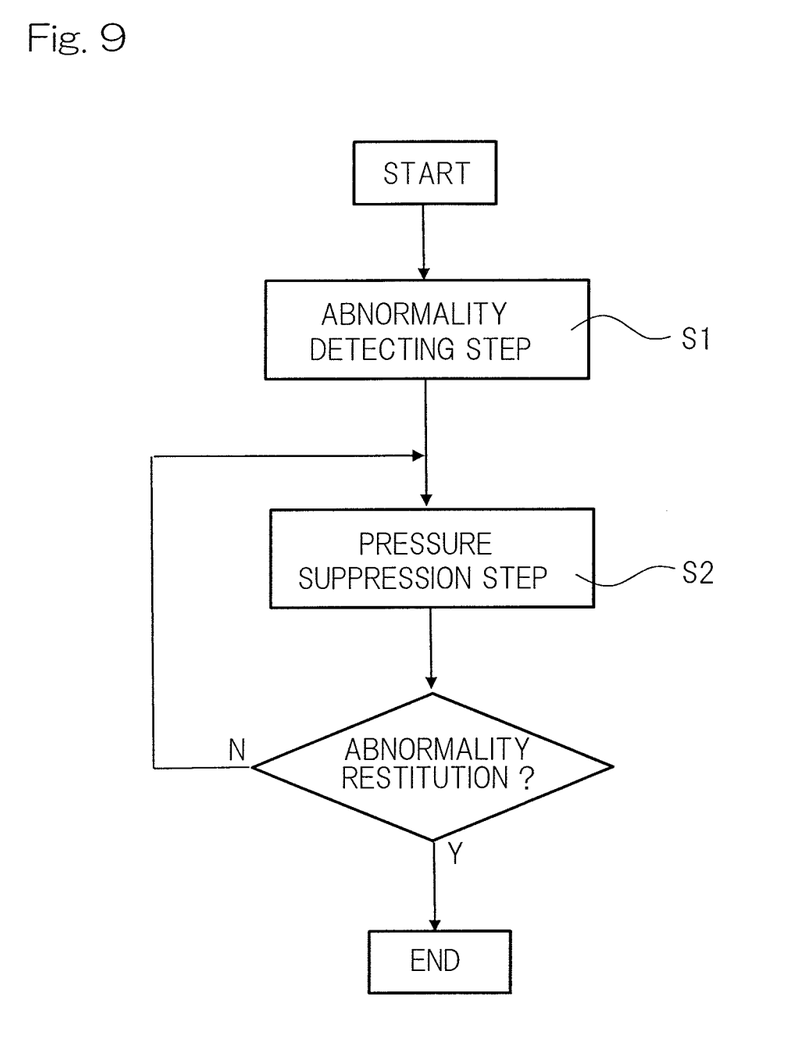
FIG. 9 is a flowchart showing a control method for the fuel evaporative gas treatment device executed when an abnormality has occurred.

FIG. 9 is a flowchart showing a control method for the fuel evaporative gas treatment device 75 executed when an abnormality has occurred. The control method includes an abnormality detecting step S1 and a pressure suppression step S2. In the abnormality detecting step S1, an abnormality in the check valve 74 which is one type of a control valve is detected with the abnormality detecting section 136.

In the pressure suppression step S2, when an abnormality is detected in the abnormality detecting step S1, an increase in the pressure within the air intake passage 45 is suppressed by the throttle valve 43 (pressure adjuster). The pressure suppression step S2 is repeated until restitution from the abnormality. Thus, it is possible to prevent backflow from the air intake passage 45 to the canister 69. The abnormality detection may be performed during operation check after a start command is given by the rider. Thus, output suppression is performed in a state prior to supercharging, and hence it is possible to assuredly prevent the intake air I from flowing into the canister 69.

In addition, the control method shown in FIG. 9 executed when an abnormality has occurred is also applicable to the case where, instead of the check valve 74, an electric control valve which is electrically opened/closed is disposed on the communication passage 71 which connects the air intake passage 45 and the canister 69.

In the combustion engine E equipped with the supercharger 42, the pressure in the air intake passage 45 shown in FIG. 7 may become a positive pressure. In this case, unless the check valve 74 is provided between the air intake passage 45 and the communication passage 71, the high-pressure intake air I flows into the canister 69. Thus, it is necessary to consider changing the structure of the canister 69 in order to avoid deformation of the canister 69.

According to the above configuration, the check valve 74 is provided on the communication passage 71 which connects between the air intake passage 45 and the canister 69, and fluid flow from the air intake passage 45 to the canister 69 is blocked by the check valve 74. Therefore, even if the pressure in the air intake passage 45 becomes a positive pressure due to supercharging by the supercharger 42, it is possible to prevent the intake air I from flowing into the canister 69. In addition, if the pressure in the air intake passage 45 is a negative pressure or is lower than that at the fuel tank 15 side, the check valve 74 permits fluid flow from the canister 69 to the air intake passage 45. Thus, with a simple structure in which the pipes 68, 120 of two systems are connected to the canister 69 and the one valve 74 is provided, it is possible to achieve treatment of the fuel evaporative gas G and prevention of backflow without changing the structure of the canister 69.

Since the valve body 132 moves from the air intake passage 45 side to the canister 69 side to close the valve port 128 as shown in FIG. 8, it is possible to assuredly prevent the intake air I from flowing into the canister 69 when the pressure in the air intake passage 45 becomes a positive pressure.

Since the check valve 74 includes the drive section M which moves the valve body 132 on the basis of a control command from the control unit CU (FIG. 7), a check valve and a solenoid valve are combined, and as a result, it is possible to reduce the number of components. In addition, since the solenoid valve is used, it is possible to open and close the valve at any timing.

Furthermore, the check valve 74 includes the biasing body 134 which biases the valve body 132 in the direction toward the seated position P1, and the drive section M moves the valve body 132 to the non-seated position P2 against the biasing force of the biasing body 134 when being energized. By so doing, it is possible to close the valve port 128 by the biasing force of the biasing body 134 even during de-energization. Therefore, even in an abnormal state in which energization is not possible, the check valve 74 can operate as a normal check valve to avoid undesirable opening of the check valve 74, thereby preventing intake air from flowing into the canister 69 side.

In a state where the check valve 74 is mounted on the motorcycle, the valve port 128 is located below the valve body 132. Thus, a force acts in a direction in which the check valve 74 closes due to the weight of the valve body 132, and therefore, it is possible to reduce the biasing force of the biasing body 134.

The pressure adjuster (throttle valve) 43 suppresses an increase in the pressure within the air intake passage 45, when the abnormality detecting section 136 shown in FIG. 7 detects an abnormality in the drive section M. Therefore, even if an abnormal state in which energization is not possible is caused, by reducing the opening degree of the throttle valve 43, it is possible to suppress an increase in the pressure within the air intake passage 45 to prevent the intake air I from flowing into the canister 69.

Even in a state where the abnormality detecting section 136 detects an abnormality in the drive section M, with the throttle valve 43 operable by an operation of the rider, it is possible to adjust the output of the combustion engine E by an operation of the rider even after detection of the abnormality.

When the abnormality detecting section 136 detects an abnormality in the drive section M, control is performed such that the fuel injection amount of the main injector 47 is reduced. Thus, even in a state where the opening degree of the air intake passage 45 is reduced after detection of the abnormality, it is possible to prevent the air-fuel ratio from becoming a value corresponding to a rich state.

Since the canister 69 is disposed above the combustion engine E and between the head pipe 4 and the fuel tank 15 as shown in FIG. 1, the distances from the canister 69 to the fuel tank 15 and the throttle body 44 is rendered to be short. Therefore, the pipes 72, 68 connected to the canister 69 shown in FIG. 4 is rendered to be short, and thus these pipes 72, 68 are easily handled. In addition, since both ends 120a, 120b of the first communication pipe 120 are supported indirectly (via the throttle body 44) or directly by the combustion engine E, the first communication pipe 120 can be stably supported. Also, since the first communication pipe 120 is installed into the combustion engine E simultaneously with assembling of the combustion engine E, it is unnecessary to mount the first communication pipe 120 to both the motorcycle and the combustion engine E after the combustion engine E is mounted to the motorcycle. Accordingly, the first communication pipe 120 is easily mounted on the motorcycle.

Since the canister 69 is disposed between the pair of left and right main frame pieces 1a, 1a shown in FIG. 3, the canister 69 can be disposed rearward of the head pipe 4 and in a vacant space between the left and right main frame pieces 1a, 1a.

The canister 69 is disposed in a region which overlaps the cylinder head 32 of the combustion engine E in a plan view. Thus, the distance from the canister 69 to the throttle body 44 becomes short, and hence the communication pipe unit 72 is rendered to be short. Therefore, the communication pipe unit 72 is easily handled. In particular, the pipe for fuel evaporative gas is composed of a hard and expensive rubber tube which is processed such that fuel evaporative gas is prevented from leaking therefrom, thus the cost-effectiveness caused by shortening the pipe is great, and the effect of making handling of the pipe easy is also great.

The canister 69 has a rectangular box shape having a longitudinal direction, and is disposed such that the longitudinal direction coincides with the widthwise direction of the motorcycle. Thus, the dimensions of the canister 69 in the front-rear direction and in the up-down direction become small, and hence the canister 69 is easily disposed.

The upper surface 33a of the cylinder head cover 33 shown in FIG. 1 extends so as to be inclined downward towards the front, and the lower surface 69a of the canister 69 is opposed to the upper surface 33a of the cylinder head cover 33 and extends so as to be inclined downward towards the front. Thus, while the canister 69 is disposed above the cylinder head cover 33, a desired distance between the canister 69 and the high-temperature cylinder head cover 33 is easily ensured.

Since the canister 69 is disposed rearward of the radiator 25 shown in FIG. 4 and the heat shield cover body 70 is disposed between the canister 69 and the radiator 25, the canister 69 is protected from exhaust air of the radiator 25.

The canister 69 is disposed frontward of the air intake chamber 52 shown in FIG. 1, and the air intake duct 50 extends through the outer side (the left side), in the widthwise direction of the motorcycle, of the canister 69. Thus, it is possible to prevent interference between the air intake duct 50 and the canister 69. Since the communication pipe unit 72 is disposed at the right side of the canister 69, it is possible to avoid interference between the communication pipe unit 72 and the air intake duct 50.

The present invention is not limited to the preferred embodiment described above, and various additions, modifications, or deletions may be made without departing from the gist of the invention. For example, in the preferred embodiment described above, both ends of the first communication pipe 120 are supported by the combustion engine E by the check valve 74 being supported by the combustion engine E, but both ends of the communication pipe unit 72 may be supported by the combustion engine E by supporting the canister 69 at the combustion engine E. In addition, the check valve 74 may be a known mechanical check valve which does not include the drive section M.

The communication passage 71 may be connected to a front portion of the throttle body 44. In addition, other than a mechanical supercharger which is driven by power of the crankshaft 26, the supercharger 42 may be a turbo supercharger which is driven by the internal energy of exhaust gas. In the preferred embodiment described above, the electrically-controlled throttle system is used, but may not be used.

The present invention is applicable not only to a motorcycle but also to vehicles such as a three-wheel vehicle and a four-wheel buggy. However, from the following reasons, the present invention is particularly effective for a motorcycle. Specifically, since a motorcycle has a small dimension in the widthwise direction of the motorcycle and thus a space for installing the canister is limited, the canister is disposed at a position close to the air intake passage. Thus, in the case of a combustion engine equipped with a supercharger, intake air is likely to flow into the canister. In addition, the weight of the motorcycle is relatively low, and thus the rotation speed of the combustion engine is likely to rapidly increase. Therefore, the internal pressure in the air intake passage is likely to increase, and intake air is likely to flow into the canister. As a result, the present invention is particularly effective for a motorcycle. Therefore, this is construed as included within the scope of the present invention.

REFERENCE NUMERALS

1a . . . main frame piece
4 . . . head pipe
15 . . . fuel tank
18 . . . seat
25 . . . radiator
28 . . . crankcase
32 . . . cylinder head
33 . . . cylinder head cover
43 . . . throttle valve
44 . . . throttle body
45 . . . air intake passage
50 . . . air intake duct
52 . . . air intake chamber
69 . . . canister
70 . . . heat shield cover body
72 . . . communication pipe unit
E . . . combustion engine

What is claimed is:

1. A motorcycle comprising:
a head pipe;
a seat;
a fuel tank disposed between the head pipe and the seat;
a combustion engine disposed below the fuel tank;
a canister disposed in a region from a gap between the head pipe and the fuel tank in a front-rear direction to a space below a front portion of the fuel tank, the canister containing an adsorbent which adsorbs fuel evaporative gas from the fuel tank;
a throttle body disposed at the combustion engine, the throttle body forming an air intake passage on which a throttle valve is provided; and
a communication pipe connecting the canister and the air intake passage, the communication pipe having one end supported by the throttle body and the other end supported by the combustion engine.

2. The motorcycle as claimed in claim 1, further comprising a pair of left and right main frame pieces branching from the head pipe and extending rearward, wherein the canister is disposed between the pair of left and right main frame pieces.

3. The motorcycle as claimed in claim 1, wherein at least a part of the canister is disposed in a region which overlaps a cylinder head of the combustion engine in a plan view.

4. The motorcycle as claimed in claim 1, wherein the canister has a box shape having a longitudinal direction, and is disposed such that the longitudinal direction coincides with a widthwise direction of the motorcycle.

5. The motorcycle as claimed in claim 1, wherein
a cylinder head cover of the combustion engine has an upper surface extending so as to be inclined downward towards the front, and
the canister has a lower surface which is opposed to the upper surface of the cylinder head cover and extends so as to be inclined downward towards the front.

6. The motorcycle as claimed in claim 2, wherein the canister is supported by the head pipe via an elastic body.

7. The motorcycle as claimed in claim 6 wherein the elastic body is configured as a damper box to mount the canister between a pair of brackets attached respectively to the head pipe to absorb vibrations.

8. The motorcycle as claimed in claim 4, further comprising a check valve provided on the communication pipe, wherein
the communication pipe and the check valve are disposed at an outer side of the canister in the widthwise direction.

9. The motorcycle as claimed in claim 8, wherein the check valve is supported on an injection chamber cover that is mounted on a cylinder head cover.

10. A motorcycle comprising:
a head pipe;
a seat;
a fuel tank disposed between the head pipe and the seat;
a combustion engine disposed below the fuel tank;
a canister disposed in a region from a gap between the head pipe and the fuel tank in a front-rear direction to a space below a front portion of the fuel tank, the canister containing an adsorbent which adsorbs fuel evaporative gas from the fuel tank;
a throttle body disposed at the combustion engine, the throttle body forming an air intake passage on which a throttle valve is provided;
a communication pipe connecting the canister and the air intake passage, the communication pipe having one end supported by the throttle body and the other end supported by the combustion engine;
a radiator disposed frontward of the combustion engine, the canister is being disposed rearward of the radiator; and
a heat shield cover body disposed between the canister and the radiator.

11. A motorcycle comprising:
a head pipe;
a seat;
a fuel tank disposed between the head pipe and the seat;
a combustion engine disposed below the fuel tank;
a canister disposed in a region from a gap between the head pipe and the fuel tank in a front-rear direction to a space below a front portion of the fuel tank, the canister containing an adsorbent which adsorbs fuel evaporative gas from the fuel tank;
a throttle body disposed at the combustion engine, the throttle body forming an air intake passage on which a throttle valve is provided;
a communication pipe connecting the canister and the air intake passage, the communication pipe having one end supported by the throttle body and the other end supported by the combustion engine;
an air intake chamber disposed above a crankcase of the combustion engine, the air intake chamber being configured to store intake air for the combustion engine, the canister being disposed frontward of the air intake chamber; and
an air intake duct configured to introduce incoming wind through one lateral side of the canister, which is an outer side in a widthwise direction of the motorcycle, into the air intake chamber.

12. The motorcycle as claimed in claim 11, wherein the communication pipe is disposed at the other lateral side of the canister.

* * * * *